(12) United States Patent
Yu et al.

(10) Patent No.: US 8,168,156 B2
(45) Date of Patent: May 1, 2012

(54) METHOD OF FABRICATING LAYERED NANOMATERIAL USED FOR MID-HIGH TEMPERATURE CO₂ CAPTURE

(75) Inventors: Ching-Tsung Yu, Taoyuan (TW); Yau-Pin Chyou, Taipei (TW); San-Yuan Chen, Hsinchu (TW); Chih-Hsiang Wu, Taoyuan (TW)

(73) Assignee: Atomic Energy Council-Institute of Nuclear Energy Research, Taoyuan (TW)

( * ) Notice: Subject to any disclaimer, the term of this patent is extended or adjusted under 35 U.S.C. 154(b) by 175 days.

(21) Appl. No.: 12/702,552

(22) Filed: Feb. 9, 2010

(65) Prior Publication Data
US 2010/0248956 A1    Sep. 30, 2010

(30) Foreign Application Priority Data

Mar. 27, 2009  (TW) .................................. 098110083

(51) Int. Cl.
*C01F 7/00*    (2006.01)
(52) U.S. Cl. ..................... 423/600; 423/593.1; 502/414; 501/141
(58) Field of Classification Search .................. 501/141; 423/593.1, 600
See application file for complete search history.

(56) References Cited

U.S. PATENT DOCUMENTS 5,358,701 A * 10/1994 Pinnavaia et al. .......... 423/242.1
7,919,066 B2 * 4/2011 Sauerwein et al. ........ 423/420.2

OTHER PUBLICATIONS

Incorporation of poly(acrylic acid), poly(vinylsulfonate) and poly(styrenesulfonate) within layered double hydroxides Christopher O. Oriakhi, Isaac V. Farr and Michael M. Lerner J. Mater. Chem., 1996, 6, 103-107 DOI: 10.1039/JM9960600103.*

* cited by examiner

*Primary Examiner* — Stuart Hendrickson
*Assistant Examiner* — Richard M Rump
(74) *Attorney, Agent, or Firm* — Jackson IPG PLLC; Demian K. Jackson

(57) ABSTRACT

A material is fabricated for capturing $CO_2$ at mid-high temperature. The material is a layered material containing Ca, Al carbonates. A higher ratio of Ca to Al helps capturing $CO_2$. The temperature for capturing $CO_2$ is around 600° C. The material can even release $CO_2$ at a high temperature. Thus, the material can process looping cycles of carbonation and decarbonization at a $CO_2$ carbonation scale of 45% $gCO_2/g$.

6 Claims, 23 Drawing Sheets

| Wavenumber (cm$^{-1}$) | Functional Group |
|---|---|
| 3470 | OH$^-$ |
| 3070 | H-bonding of H$_2$O and CO$_3^{2-}$ |
| 1620 | H$_2$O bending |
| 1415-1370 | |
| 1080 | |
| 940-880 | C-O from CO$_3^{2-}$ |
| 710-680 | |
| 3630-3510 | |
| 2410 | CaCO$_3$ |
| 1770 | |

FIG.3

| calcination temperature (°C) | 200 | 400 | 600 |
|---|---|---|---|
| surface area (m²/g) | 13.004 | 16.8 | 18.24 |
| pore area (cc/g) | 0.026 | 0.04 | 0.032 |
| aver. Pore diameter (Å) | 37.77 | 51.2 | 32.68 |

FIG.5

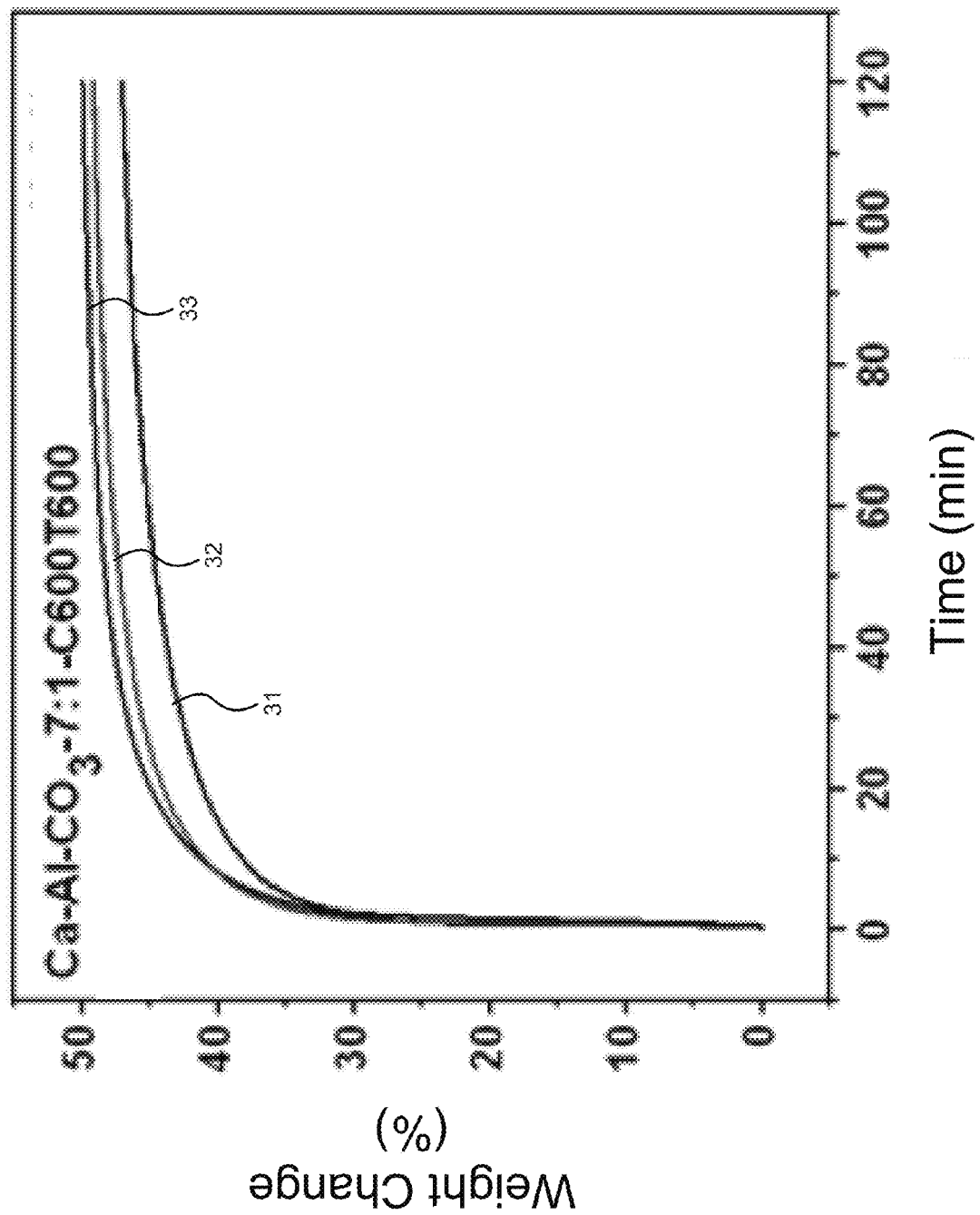

METHOD OF FABRICATING LAYERED NANOMATERIAL USED FOR MID-HIGH TEMPERATURE $CO_2$ CAPTURE

FIELD OF THE INVENTION

The present invention relates to fabricating a $CO_2$-capturing material; more particularly, relates to fabricating a layered nanomaterial for capturing $CO_2$ at mid-high temperature.

DESCRIPTION OF THE RELATED ARTS $CO_2$ capture from exhaust is a kind of GHG emission reduction technology. Basically, it is a reaction of acid and base, where an alkaline sorbent like amine liquid, alcoholamine or other solid (e.g. naturally occurring minerals, $K_2CO_3$, CaO, etc.) is used to react with an acidic gas containing $CO_2$. Since every sorbent has different characteristics, each has to be used within its specific temperature range. One example is to capture $CO_2$ from fuel gas or flue gas of fossil, including post-combustion and pre-combustion technology.

A commercial $CO_2$ emission reduction technology is post-combustion capture, where alkaline liquid, like monoethanolamine (MEA) and (2-aminoethyl)ethanolamine (AEEA), is used as $CO_2$-capturing material from flue gas. Stream temperature is set between 40° C. and 60° C. and $CO_2$ has a concentration between 6% and 15%. In a typical condition, an absorption tower is used for capturing $CO_2$, and stripper is used to regenerate rich amine solution. However, it suffers from some disadvantages, such as heat is required for obtaining the lean solution and devices may be corrosive due to high-concentration alcoholamine. This kind of $CO_2$ capture method belongs to wet chemistry. Basically, system pressure drop is harmful to plant efficiency and is non-friendly technology to environment. Usually, the cost for generating electricity may be increased over 50% and efficiency may be reduced between 15 and 25%. Therefore, above-mentioned wet amine is unsuitable to capture $CO_2$ at a temperature higher than 400° C.

In order to develop mid-high dry sorbents, there are three kinds of $CO_2$ sorbents for mid-high temperature between 400 and 800° C. One is a mineral containing Mg, Ca oxides, like serpentine or limestone; another is obtained through synthesis of micro- and nanomaterials, like CaO nanoparticles, metal organic frameworks (MOFs) or hydrotalcite-like compounds having IIA group elements; and, the other is obtained through modification on a high surface area support, like $Ca^{+2}$ coated on a support of silica or zeolite. But, their disadvantages are obvious. Although naturally occurring minerals (e.g. CaO and $CaCO_3$) have carbonation conversions greater than 50%, their cycles of carbonation and regeneration are not stable that, after 10 cycles, efficiency of carbonation becomes lower than 80% owing to sintering. The $CO_2$-capturing material, like MOFs, containing specific organic or inorganic compound has to be fabricated through a complex procedure with a high cost; not to mention their applications for high temperature is still under developed. The materials obtained through modification on a high surface area support have difficulties on controlling ratios of compounds and thus their characteristics are hard to be controlled either.

Usually, the materials obtained on support containing hydrotalcite are layered inorganic materials formed of oxides and carbonates of $Mg^{+2}$ and $Al^{+3}$. Yet, some containing $Zn^{+2}$, $Ga^{+2}$, $Ni^{+2}$, $Cu^{+2}$, $Mn^{+2}$, $Fe^{+3}$ and $Cr^{+3}$ may be fabricated too. Although the materials obtained on support can be fabricated easily with low cost, most inorganic materials containing $Mg^{+2}$—$Al^{+3}$—$CO_3^{2-}$ are not fit to be used for capturing $CO_2$ at mid-high temperature between 400 and 800° C. Typically, only 2.2 to 5% $gCO_2/g$ is captured at 200° C. Besides, $MgCO_3$ obtained after capturing $CO_2$ does not have a high temperature for regeneration, which is 385° C.

CaO has a high carbonation conversion up to 78.5% $gCO_2/g$ theoretically. $CaCO_3$ is rapidly obtained after capturing $CO_2$ with a heat of reaction at −178 kJ/mol $CO_2$, which proves CaO a stable thermodynamic material and a potential $CO_2$-capturing material while $CaCO_3$ is decomposed at 750° C. However, some of the reactions between CaO and $CO_2$ are not reversible; and $CaCO_3$ may be sintered with grains gathered and pores destroyed.

Hence, the prior arts do not fulfill all users' requests on actual use.

SUMMARY OF THE INVENTION

The main purpose of the present invention is to fabricate a nanomaterial for fast capturing $CO_2$ at mid-high temperature, where the mid-high temperature is 600° C.; and the capturing capacity varies between 20 and 64% $gCO_2/g$ sorbent according to a content ratio of Ca to Al.

To achieve the above purpose, the present invention is a method of fabricating a layered nanomaterial used for mid-high temperature $CO_2$ capture, comprising steps of: (a) obtaining nitrate solutions of $Ca^{+2}$ and $Al^{+3}$ as cationic solutions and obtaining NaOH solutions and $Na_2CO_3$ solutions as precipitated agents; (b) uniformly mixing the cationic solutions and the precipitated agents into a mixture solution; (c) processing a hydrothermal treatment to the mixture solution; (d) collecting precipitates through centrifugal separation and precipitation; (e) water-washing the precipitates and then drying the precipitates to remove impurity of ions; and (f) processing the precipitates at a calcination temperature between 200 and 600° C. to obtain a $CO_2$-capturing material which has Ca, Al carbonate, where the $CO_2$-capturing material processes a gas having $CO_2$ at a temperature between 400 and 800° C. for carbonation and regeneration. Accordingly, a novel method of fabricating a $CO_2$-capturing nanomaterial for mid-high temperature is obtained.

BRIEF DESCRIPTION OF THE DRAWINGS

The present invention will be better understood from the following detailed description of the preferred embodiment according to the present invention, taken in conjunction with the accompanying drawings, in which

FIG. 3 is the view showing the FTIR absorption peaks;

FIG. 5 is the view showing the various relationships between the surface areas and the pores;

FIG. 9A and FIG. 9B are the views showing the $CO_2$ absorption effects at the ratios of 60 ml/min and 10 ml/min;

DESCRIPTION OF THE PREFERRED EMBODIMENT

The following description of the preferred embodiment is provided to understand the features and the structures of the present invention.

Figure 1:
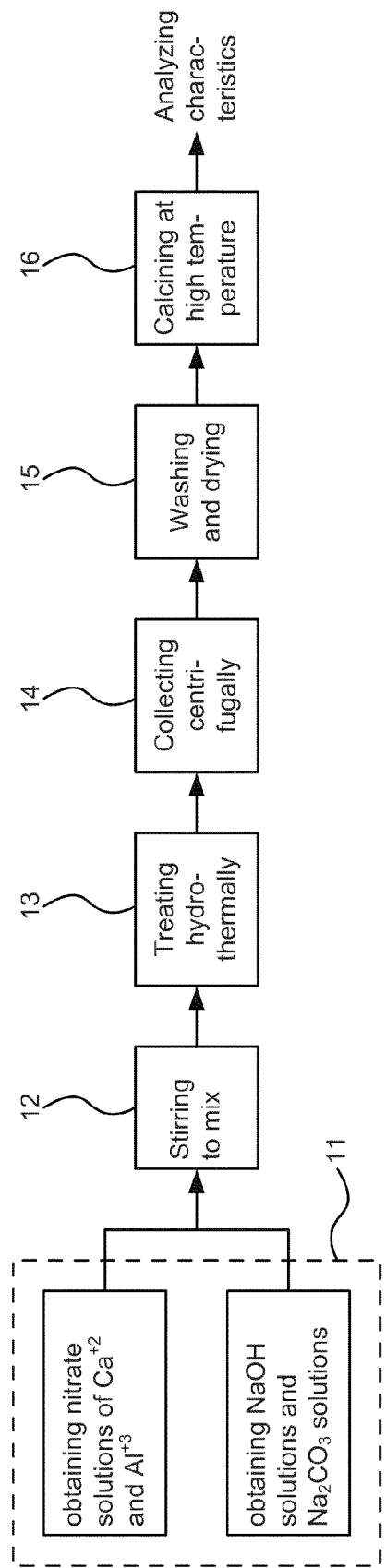
FIG. 1 is the flow view showing the preferred embodiment according to the present invention.

Please refer to FIG. 1, which is a flow view showing a preferred embodiment according to the present invention. As shown in the figure, the present invention is a method of fabricating a layered nanomaterial used for mid-high temperature $CO_2$ capture, comprising the following steps:

(a) Preparing solutions 11: Nitrate solutions of $Ca^{+2}$ and $Al^{+3}$ are obtained as cationic solutions; and NaOH solutions and $Na_2CO_3$ solutions are obtained as precipitated agents.

(b) Stirring to mix 12: The cationic solutions and the precipitated agents are uniformly mixed into a mixture solution.

(c) Treating hydrothermally 13: A hydrothermal treatment is processed to the mixture solution at about 150° C.

(d) Collecting centrifugally 14: Precipitates of hydroxides and carbonates of Ca and Al are collected through centrifugal separation and precipitation.

(e) Washing and drying 15: The precipitates are washed with water and then are dried to remove impurity of ions.

(f) Calcining at high temperature 16: The precipitates are processed at a calcination temperature between 200° C. and 600° C. to obtain a $CO_2$-capturing material which has Ca, Al carbonate, Ca—Al—$CO_3$.

The $CO_2$-capturing material obtained through the fabricating method has a using method, comprising the following steps:

(a) The $CO_2$-capturing material having oxides of Ca and Al is obtained.

(b) The $CO_2$-capturing material contacts with an object containing $CO_2$.

(c) Carbonation or regeneration is processed with the $CO_2$-capturing material and the object containing $CO_2$ at a temperature between 400 and 800° C.

Therein, the using method is based on interactions between CaO and $CO_2$; and, particles of the $CO_2$-capturing material are nanoparticles for improving $CO_2$-capturing efficiency, sized from mesopores to micropores.

On fabricating the $CO_2$-capturing material of Ca—Al—$CO_3$, nitrate solutions of $Ca^{+2}$ and $Al^{+3}$ having 1 M concentration are obtained as cationic solutions; and NaOH solutions having 1.6 M concentration and $Na_2CO_3$ solutions having 0.1 M concentration are obtained as precipitated agents. Then, the cationic solutions are added with the precipitated agents. A mixture solution is obtained after stirring to mix uniformly and is placed into an oven for a hydrothermal treatment for 24 hours (hr) at 80~150° C. Then the mixture solution is taken out for collecting precipitates through centrifugal separation and precipitation. At last, after being water-washed with deionized water several times and being dried, the precipitates are processed at a calcination temperature between 400° C. and 600° C. Thus, the $CO_2$-capturing material of Ca—Al—$CO_3$ is obtained.

Figure 2:
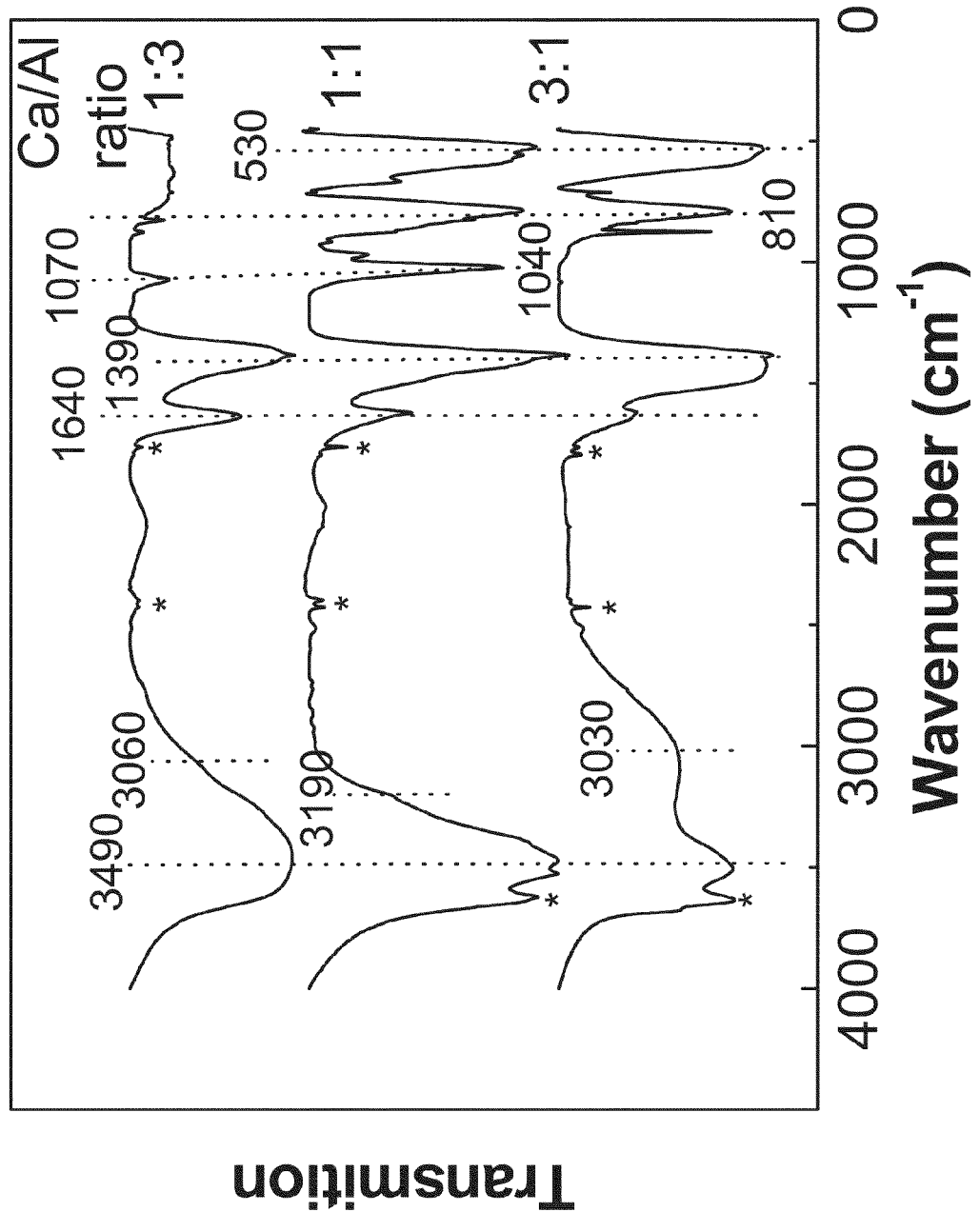
FIG. 2 is the view showing the FTIR spectrums of materials having various ratios of Ca:Al.

Please refer to FIG. 2 and FIG. 3, which are views showing FTIR spectrums and FTIR absorption peaks of materials having various ratios of Ca:Al. As shown in the figures, $CO_2$-capturing materials of Ca—Al—$CO_3$ having molar ratios of Ca:Al of 3:1, 1:1 and 1:3 are analyzed through FTIR. Therein, a vibration of $OH^-$ in a layered microstructure appears at a wavenumber of 3490 $cm^{-1}$. The H-bonding signals of $H_2O$ and $CO_3^{2-}$ in the layered microstructures differ with various composition ratios. For example, the signal lies at 3030 $cm^{-1}$ for the ratio of 3:1; 3190 $cm^{-1}$ for 1:1; and 3060 $cm^{-1}$ for 1:3. A vibration of $H_2O$ bending in the layered microstructure appears at a wavenumber of 1640 $cm^{-1}$. Absorption peaks of $CO_3^{2-}$ lies at wavenumbers of 1390, 810 and 530 $cm^{-1}$ for the ratio of 3:1; 1390, 1040, 810 and 530 $cm^{-1}$ for the ratio of 1:1; and, 1390 and 1070 $cm^{-1}$ for the ratio of 1:3. Star signs (*) in the figure indicate absorption peaks of trace $CaCO_3$.

Figure 4:
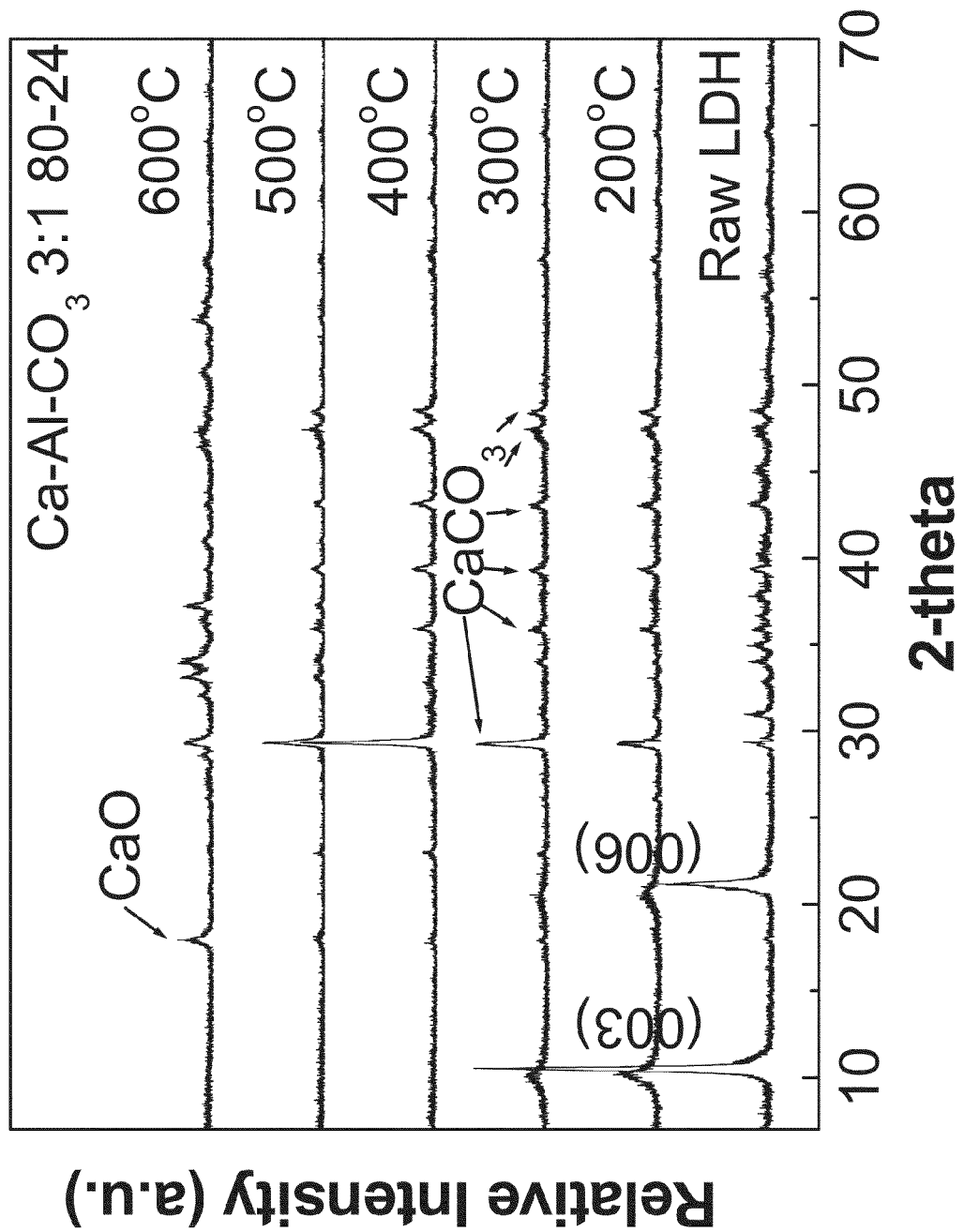
FIG. 4 is the view showing the XRD diagram for various calcination temperatures.

Please refer to FIG. 4 and FIG. 5, which are a view showing XRD diagram for various calcination temperatures; and a view showing various relationships between surface areas and pores. As shown in the figures, characteristics of a $CO_2$-capturing material of Ca—Al—$CO_3$ are affected by calcination temperature, where crystal figure, surface area and pore size are important characteristics of the $CO_2$-capturing material. Regarding capturing $CO_2$ at mid-high temperature, the best temperature for calcination lies around 600° C. According to the XRD diagram of Ca—Al—$CO_3$, obtained at a ratio of Ca:Al=3:1 at 80° C., under various calcination temperatures between 200° C. and 600° C., uncalcined binary metal hydroxides (raw layered double hydroxides (LDHs)) has a dried layered microstructure with trace $CaCO_3$. When temperature is raised from 70° C. to 200° C., crystal water in the layered microstructure disappears, yet the layered microstructures of the binary metal hydroxides are remained. When the temperature is raised to 300° C., the layered microstructures of the binary metal hydroxides are still remained, but $OH^-$ on Al—OH in octahedron becomes major loss, which turns into $H_2O$ and is lost with $CaCO_3$ increased. When the temperature is raised to 400° C., the layered microstructures of the binary metal hydroxides crash and $OH^-$ on Al—OH in octahedron is the major loss, where the structure becomes amorphous and $CaCO_3$ has the biggest amount. When the temperature reaches over 400° C., $CO_3^{2-}$ in the layered microstructure of the binary metal hydroxides turns into $CO_2$ and is lost. When the temperature reaches over 500° C., the structure of LDHs totally crash and a part of $CaCO_3$ is turned into CaO. At last, when the temperature reaches 600° C., the layered microstructures totally crash to form a metal oxide solid solution of CaO and $Al_2O_3$.

In FIG. 5, changes of the layered microstructures mainly come from thermal instability of inter-layer and intra-layer molecules of OH, $H_2O$ and $CO_3^{2-}$. Hence, when the calcination temperature is gradually raised from 200° C. to 400° C., the layered microstructures of the binary metal hydroxides crash following the raising of the temperature, where a lot of $CaCO_3$ is created and pores formed increase surface area. When the temperature is raised to 600° C., the $CaCO_3$ part starts to be decomposed into CaO to form a solid solution with $Al_2O_3$ combined. Minor part of the pores reduces size on sintering; but major part of the micropore is further increased in size with carbonates escaped as gas. Conclusively, the present invention controls the sintering temperature around 600° C. for CaO to better capture $CO_2$.

Please refer to FIG. 6A to FIG. 8, which are views showing the weight changes at 3:1 ratio and 1:1 ratio; a view showing $CO_2$ absorption for various ratios; and a view showing an XRD diagram for various ratios after absorbing $CO_2$. As shown in the figures, on using a $CO_2$-capturing material according to the present invention, a $CO_2$-capturing material of Ca—Al—$CO_3$ is put in a mixture of hot gas stream of $CO_2$ and $N_2$. An interaction of $CO_2$ and the CaO part in the Ca—Al—$CO_3$ is used for processing carbonation and regeneration. Therein, when temperature is raised gradually, increase in dynamics of the gases helps physical adsorption reaction on solid surface during capturing $CO_2$, as shown in Formul. 1. When the temperature is raised between 600° C. and 700° C., $CO_2$ is captured to obtain $CaCO_3$, as shown in Formul. 2. When the temperature is raised between 700° C. and 900° C. or higher, regeneration starts, which is a decomposition of $CaCO_3$ as shown in Formul. 3. The formulas are as follows:

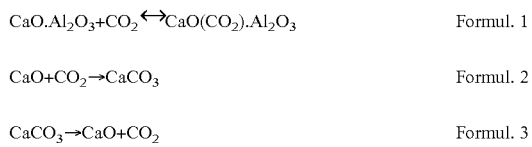

$$CaO.Al_2O_3 + CO_2 \leftrightarrow CaO(CO_2).Al_2O_3 \quad \text{Formul. 1}$$

$$CaO + CO_2 \rightarrow CaCO_3 \quad \text{Formul. 2}$$

$$CaCO_3 \rightarrow CaO + CO_2 \quad \text{Formul. 3}$$

Figure 6A:
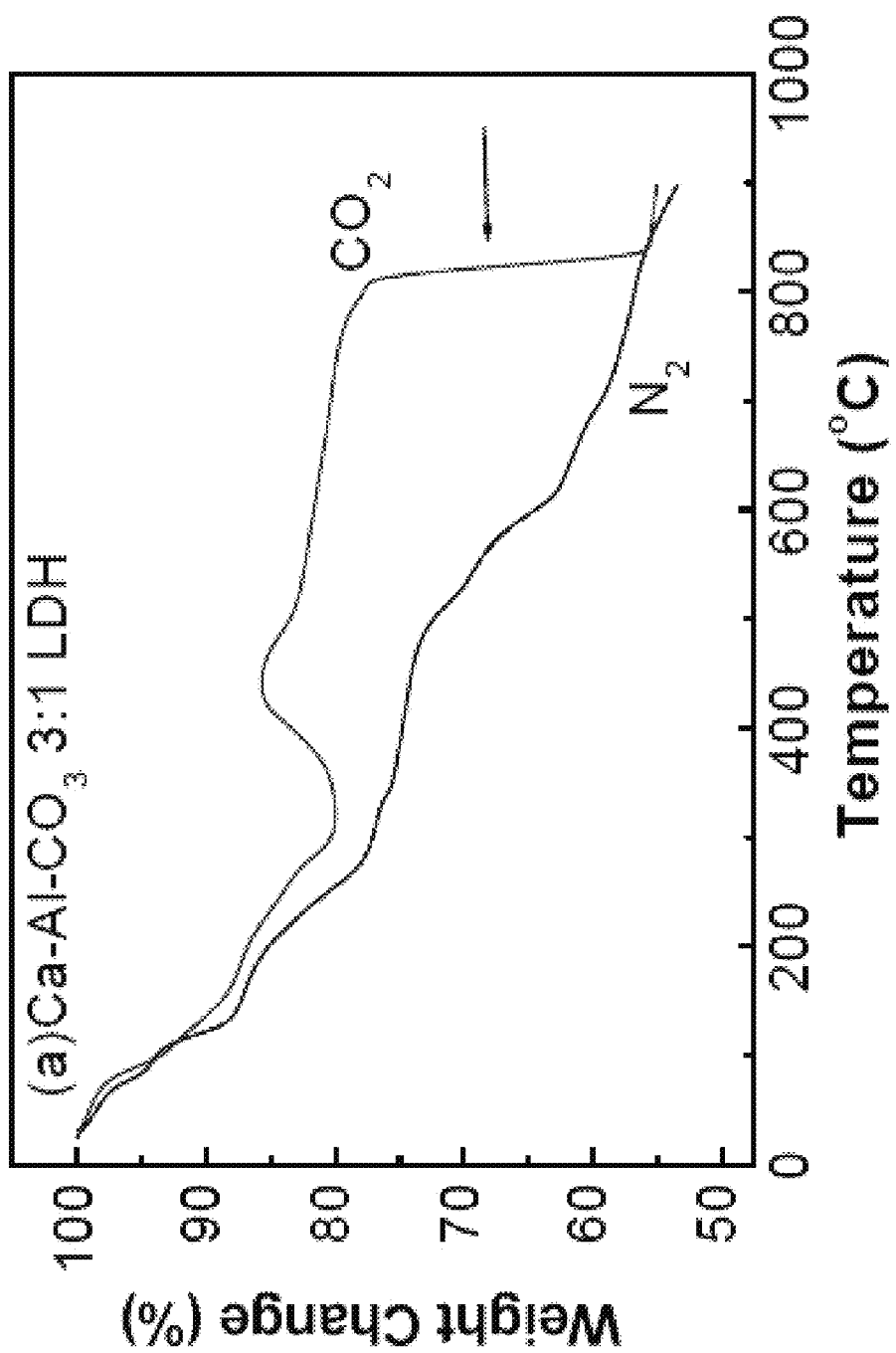
FIG. 6A and FIG. 6B are the views showing the weight changes at 3:1 ratio and 1:1 ratio.
Figure 6B:
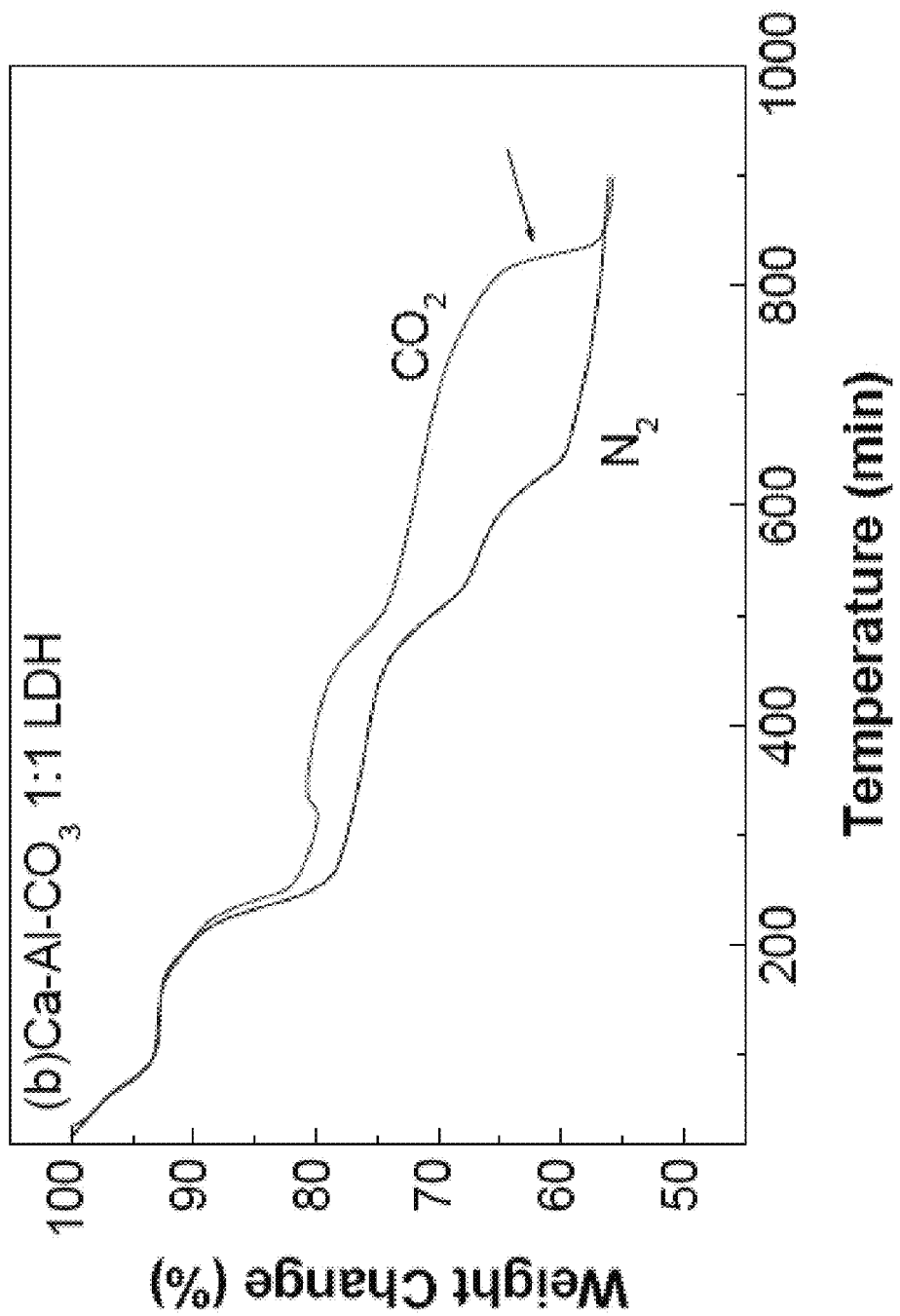
Figure 7:
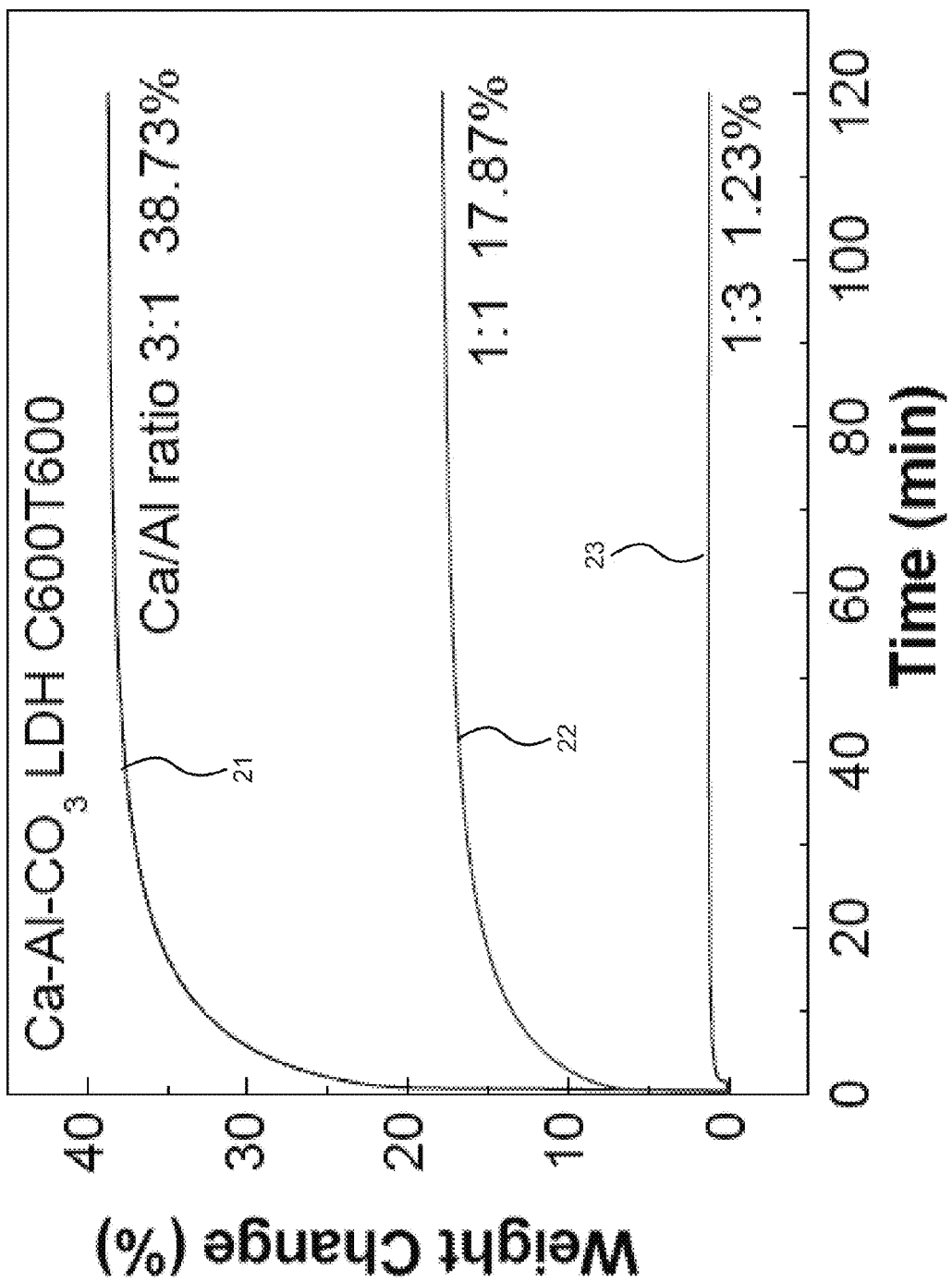
FIG. 7 is the view showing the $CO_2$ absorption for various ratios.
Figure 8:
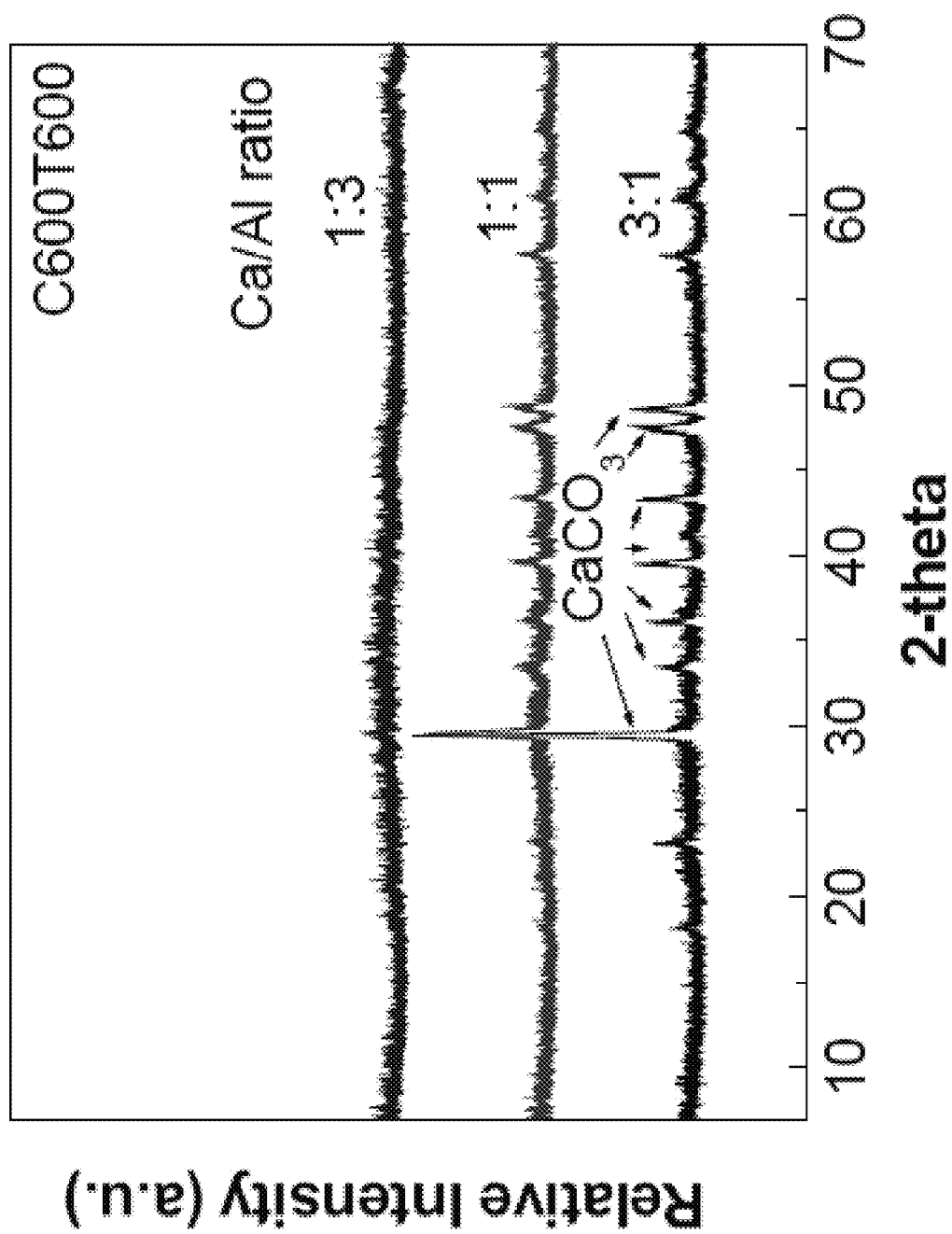
FIG. 8 is the view showing the XRD diagram for various ratios after absorbing $CO_2$.

In FIG. 6A and FIG. 6B, increase in Ca helps capturing $CO_2$. A $CO_2$-capturing material with Ca:Al=3:1 has a $CO_2$ adsorption curve 21 at 38.73%; with Ca:Al=1:1, a $CO_2$ adsorption curve 22 at 17.87%; and, with Ca:Al=1:3, a $CO_2$ adsorption curve 23 at 1.23%. In FIG. 8, Ca:Al=3:1 has the best crystalline of $CaCO_3$.

Conclusively, three factors for capturing $CO_2$ with the material of Ca—Al—$CO_3$ are Ca content, synthesis temperature and calcination temperature. A material of Ca—Al—$CO_3$ obtained with a synthesis temperature below 100° C. and with a calcination temperature at 600° C. captures more $CO_2$ while having more Ca content. For example, materials of Ca—Al—$CO_3$ having Ca:Al=1:1, 3:1, 5:1, 7:1 and 13:1 capture $CO_2$ at ratios (g $CO_2$/g LDH) of 20%, 39%, 49%, 52% and 64%.

Figure 9B:
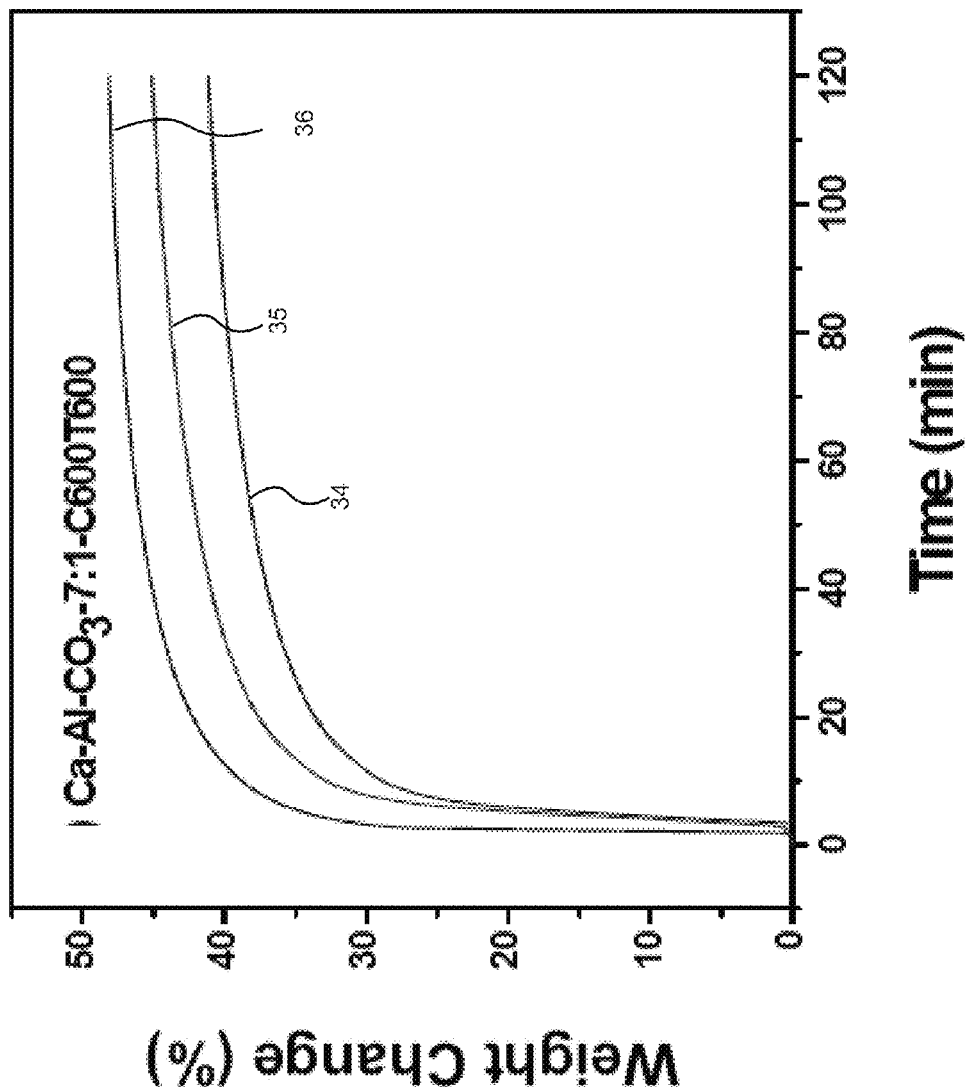
Figure 10:
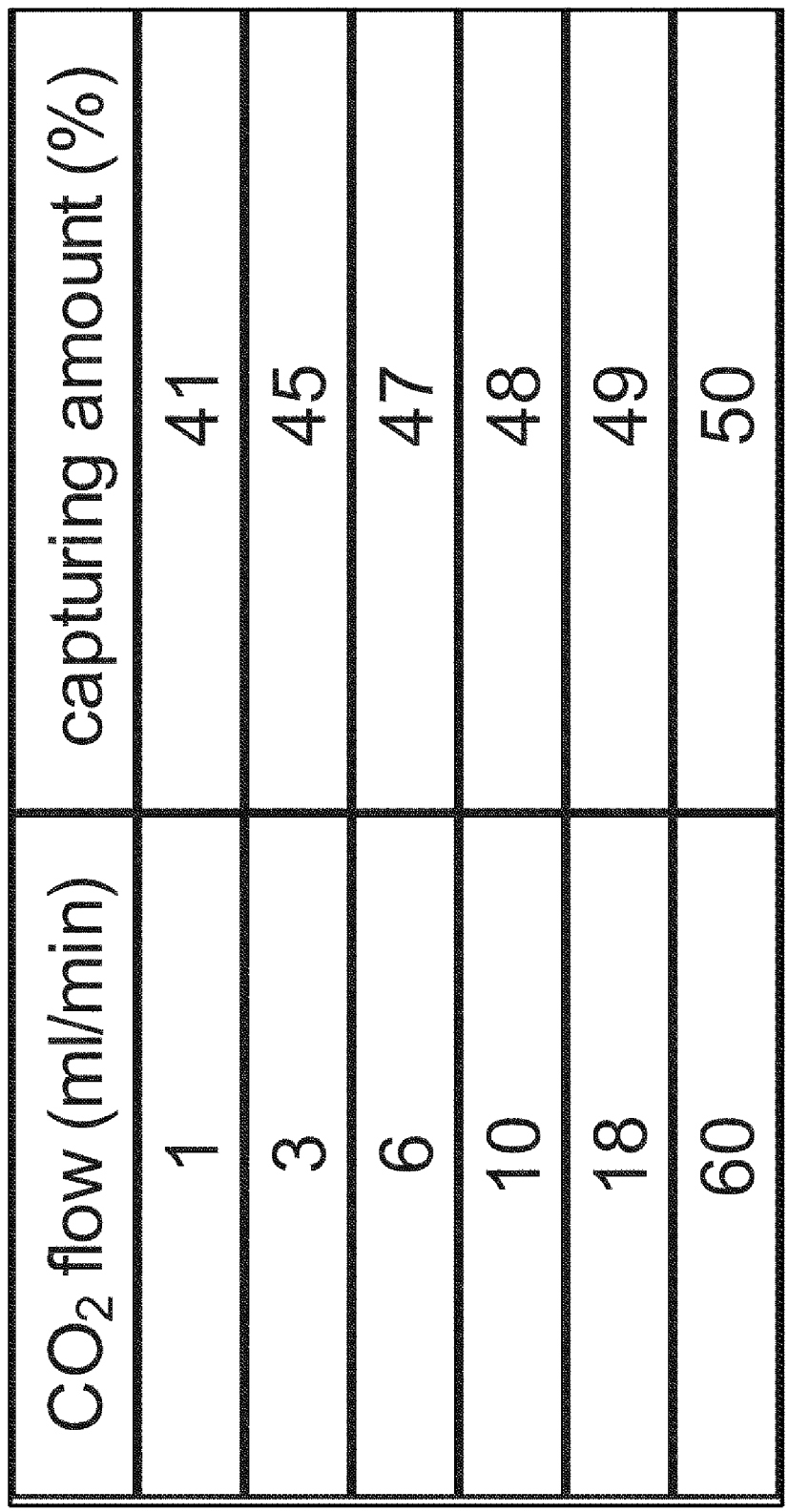
FIG. 10 is the view showing the $CO_2$-absorbing amounts at various flowing ratios.

Please refer to FIG. 9A to FIG. 10, which are views showing the $CO_2$ absorption effects at ratios of 60 ml/min and 10 ml/min; and a view showing $CO_2$-absorbing amounts at various flowing ratios. As shown in the figures, a $CO_2$-capturing material of Ca—Al—$CO_3$ with Ca:Al=7:1 is obtained and mixed gases of $CO_2/N_2$ having densities of 10%, 30% and 100% (pure $CO_2$) are flown for TGA at an amount of 60 milliliters per minutes (ml/min) and 10 ml/min. In FIG. 9A, amounts of 6, 18 and 60 ml/min of $CO_2$ are flown in at 60 ml/min. In FIG. 9B, amounts of 1, 3 and 10 ml/min of $CO_2$ are flown in at 10 ml/min. By comparing FIG. 10 with FIG. 9A, a CO2 adsorption curve 31 for 6 ml/min shows 47% of $CO_2$ is captured; a CO2 adsorption curve 32 for 18 ml/min, 49%; and a $CO_2$ adsorption curve 33 for 60 ml/min, 50%. By comparing FIG. 10 with FIG. 9B, a $CO_2$ adsorption curve 34 for 1 ml/min shows 41% of $CO_2$ is captured; a $CO_2$ adsorption curve 32 for 38 ml/min, 45%; and a $CO_2$ adsorption curve 32 for 10 ml/min, 48%. As the result shows, the $CO_2$-capturing material fabricated according to the present invention well captures $CO_2$ at 600° C.

Figure 11A:
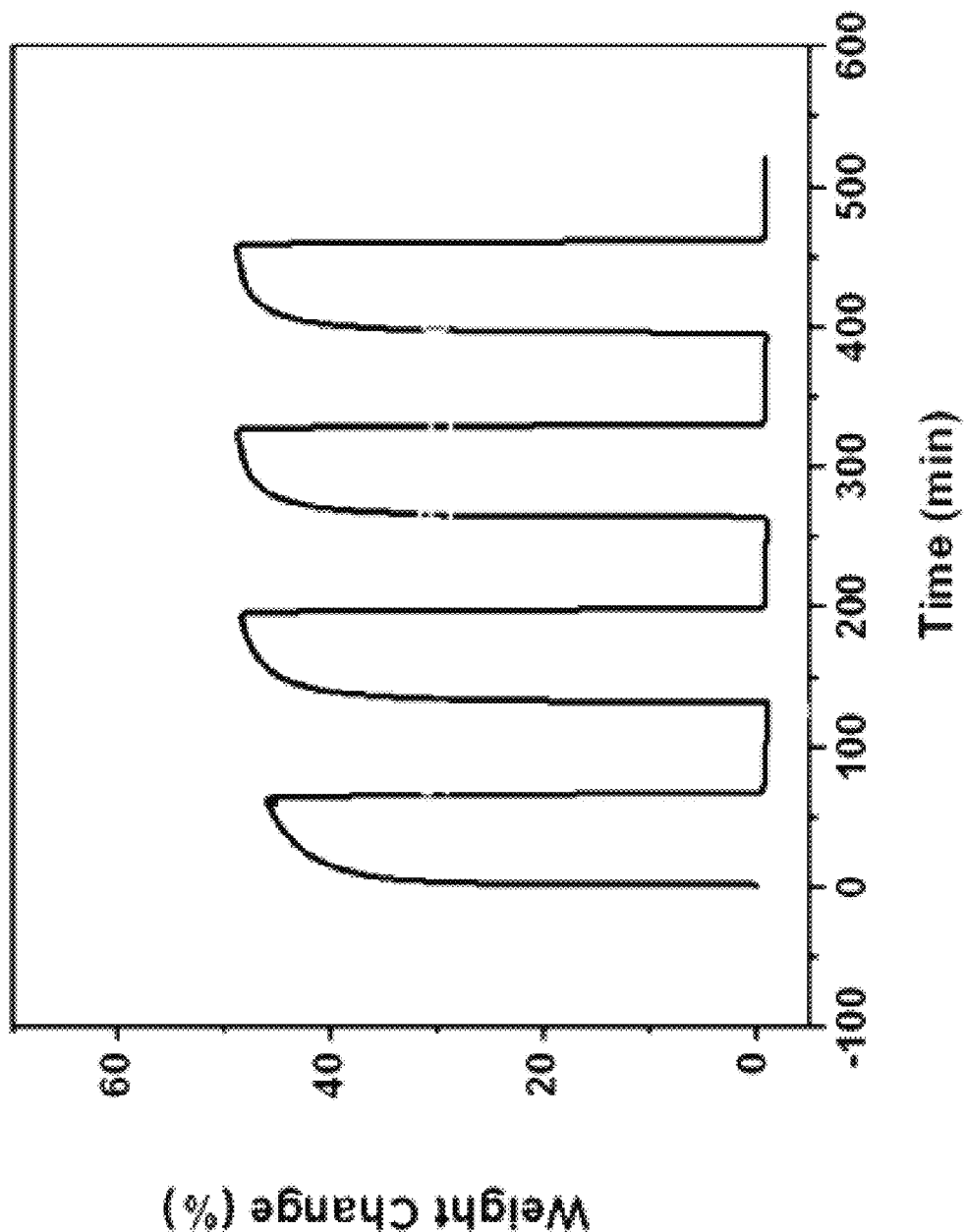
FIG. 11A and FIG. 11B are the views showing the cycles of carbonation and regeneration at 100% and 10% of $CO_2/N_2$.
Figure 11B:
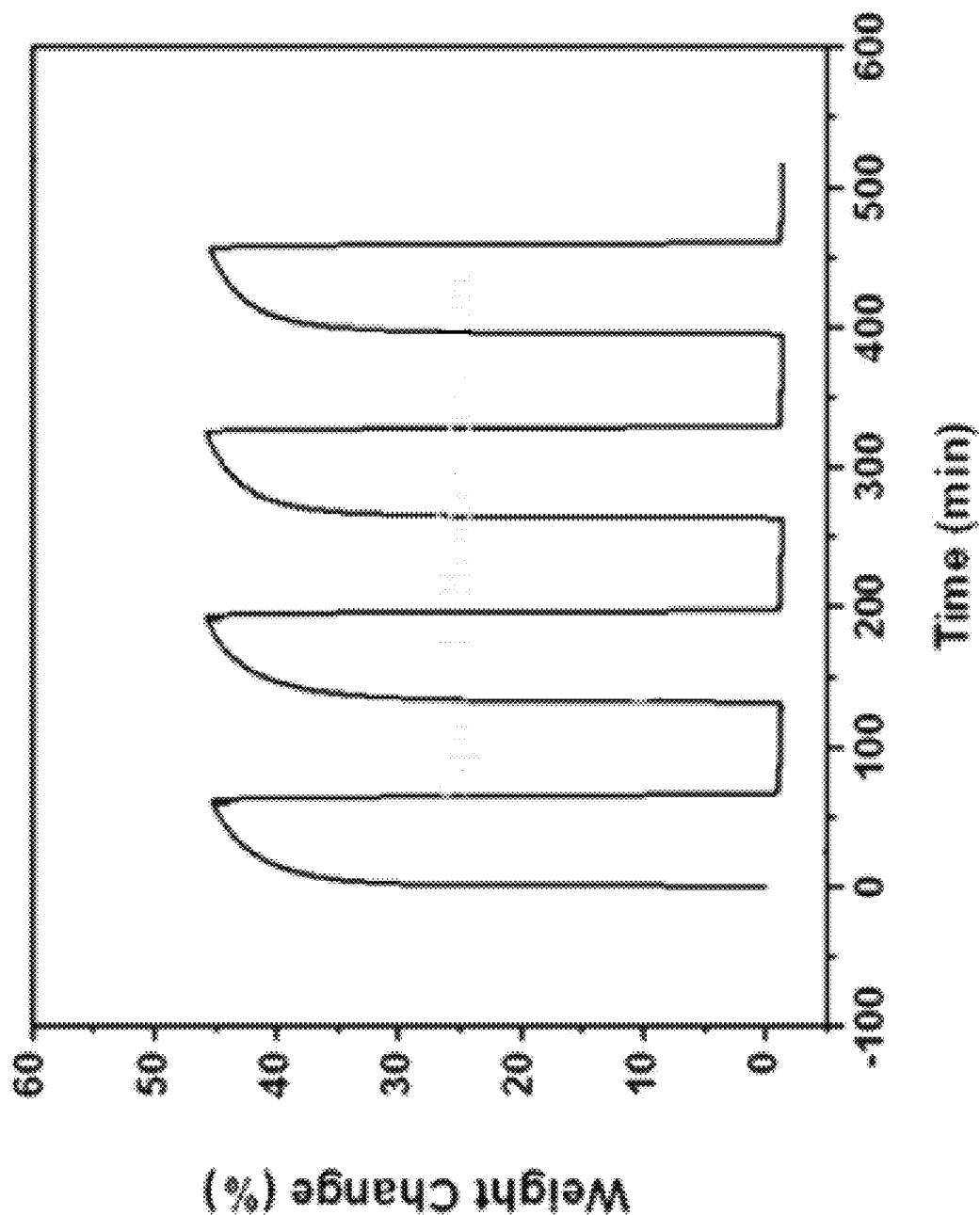

Please refer to FIG. 11A and FIG. 11B, which are views showing cycles of carbonation and regeneration at 100% and 10% of $CO_2/N_2$. As shown in the figures, a Ca—Al—$CO_3$ material with a ratio of Ca:Al=7:1 is used for capturing/releasing $CO_2$ at 600° C., where $CO_2$ is flown for TGA with densities of $CO_2/N_2$ of 100% and 10% at a ratio of 60 ml/min, i.e. 60 ml/min and 6 ml/min of $CO_2$. After $CO_2$ is captured at 600° C. for 1 hr, a mixture of $CO_2/N_2$ is changed to pure $N_2$ for releasing $CO_2$ at 750° C. for 1 hr. And the capturing and releasing is thus repeated. Therein, in FIG. 11A, in the first cycle of capturing and releasing, the Ca—Al—$CO_3$ material captures 45.3% of $CO_2$ at 600° C. and releases near 100% of $CO_2$ at 750° C.; in the following three cycles, $CO_2$ captured is increased to 50% while $CO_2$ released is still remained at 100%. In FIG. 11B, the curve is almost the same as that in FIG. 11A except that the amount of $CO_2$ captured is reduced following reducing of the flowing amount of the gas. In the four cycles, a $CO_2$ carbonation scale of 45% g$CO_2$/g is remained and a $CO_2$ decarbonization scale of 100% g$CO_2$/g is also reached in a short time. Because the layered $CO_2$-absorbing nanomaterial of a layered material containing Ca, Al carbonates has excellent structural characteristics and is thermotolerant, capturing of $CO_2$ is almost reversible and cost is thus reduced by increasing the cycles of capturing and releasing.

Figure 12:
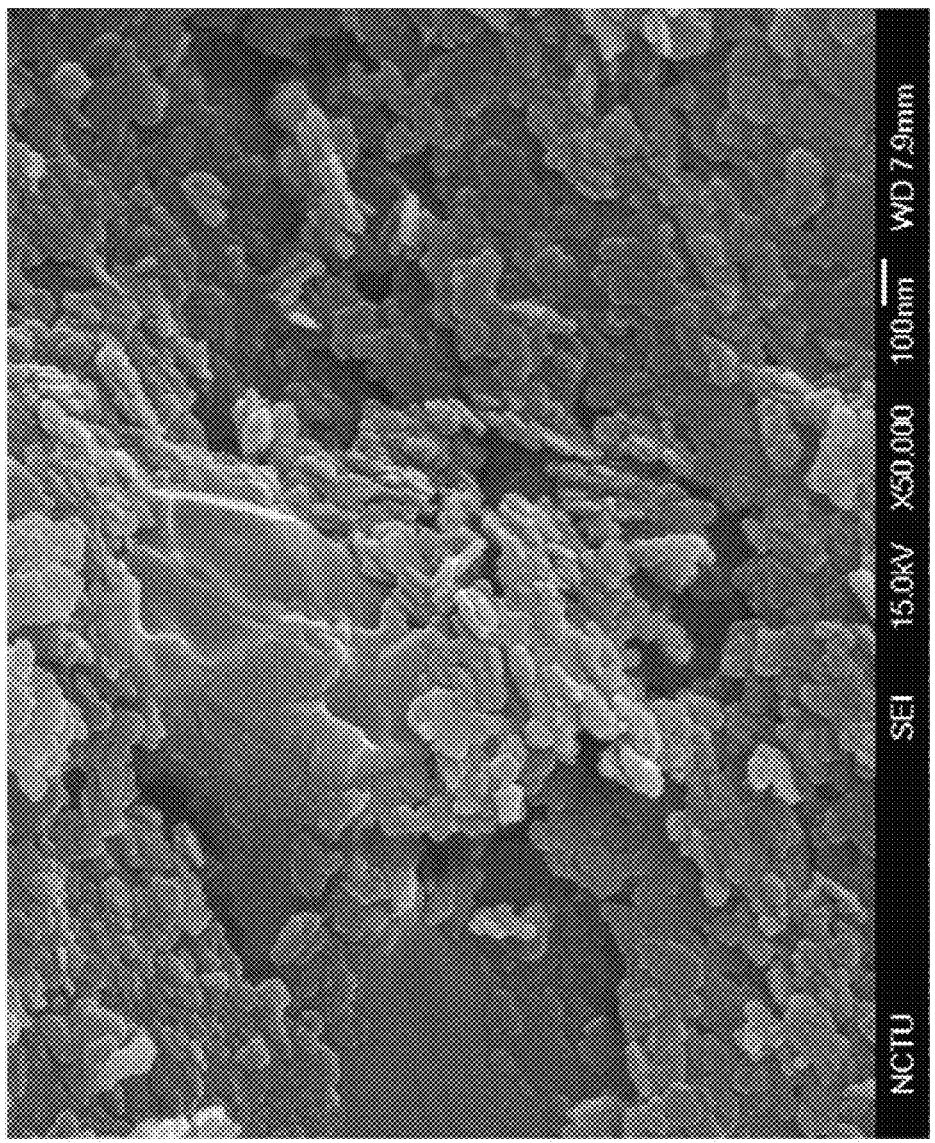
FIG. 12 is the view showing the SEM diagram of the layered $CO_2$-absorbing nanomaterial.
Figure 13:
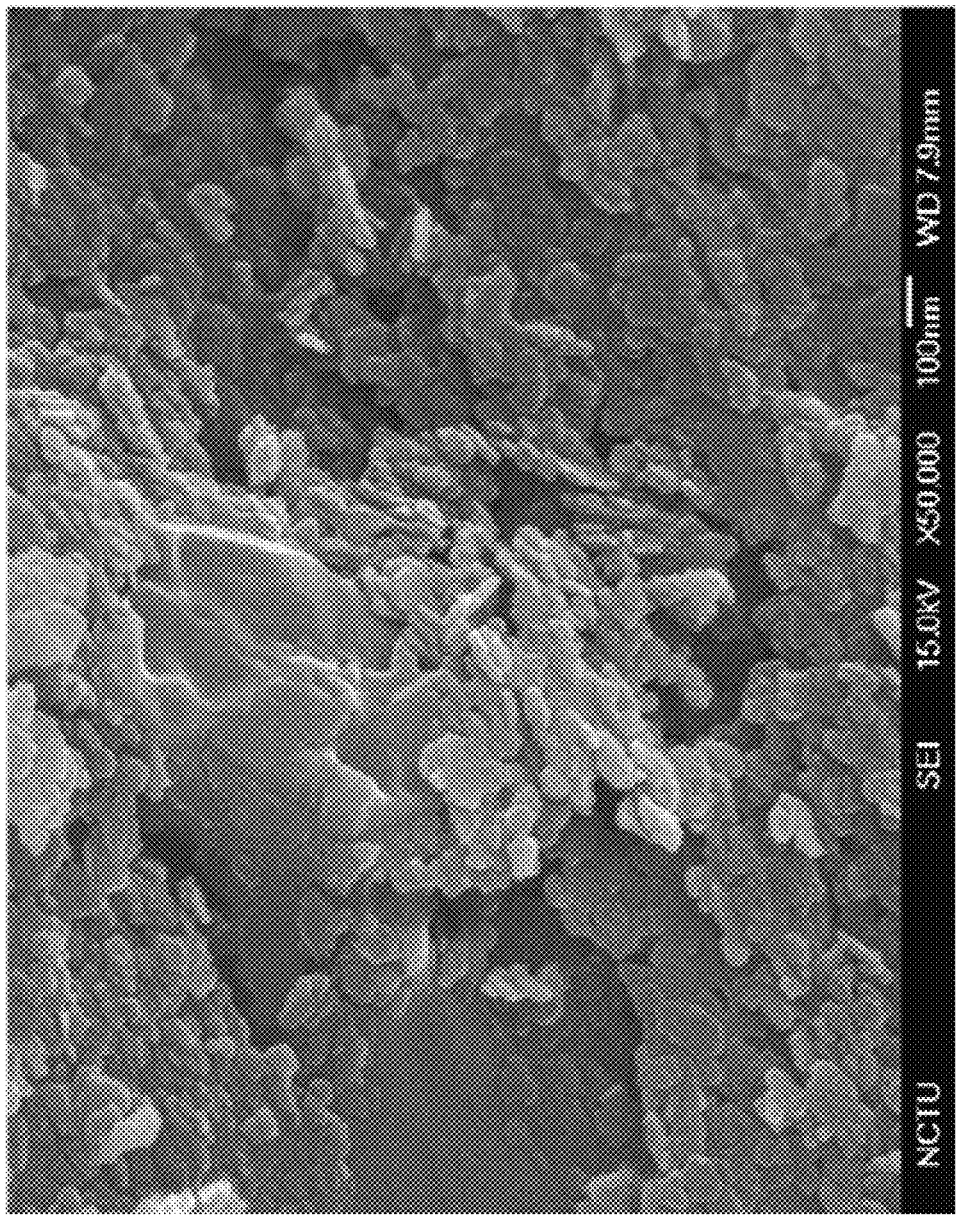
FIG. 13 is the view showing the SEM diagram at 1:1 ratio.
Figure 14A:
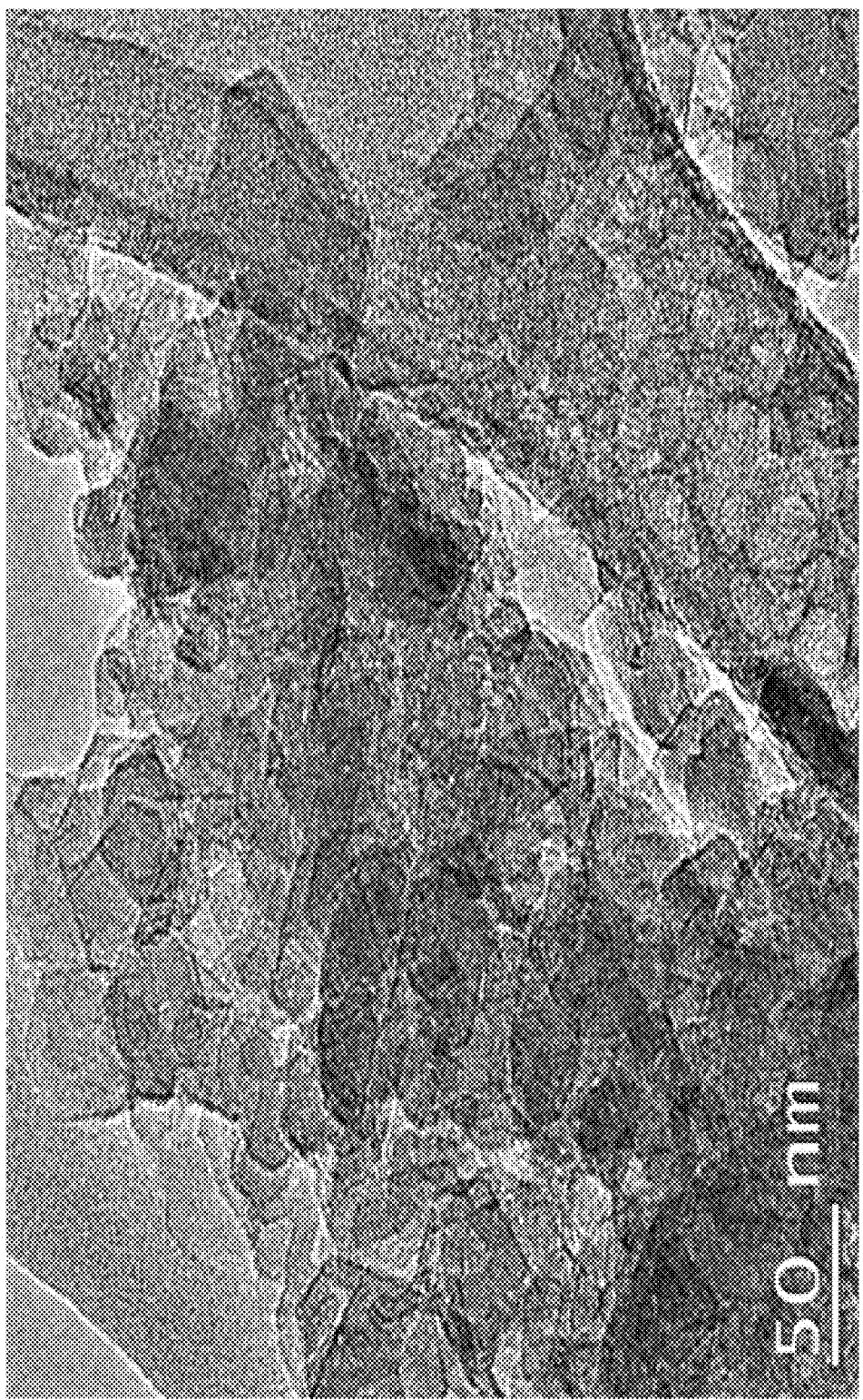
FIG. 14A and FIG. 14B are the first view and the second view showing the TEM diagram at 1:1 ratio.
Figure 14B:
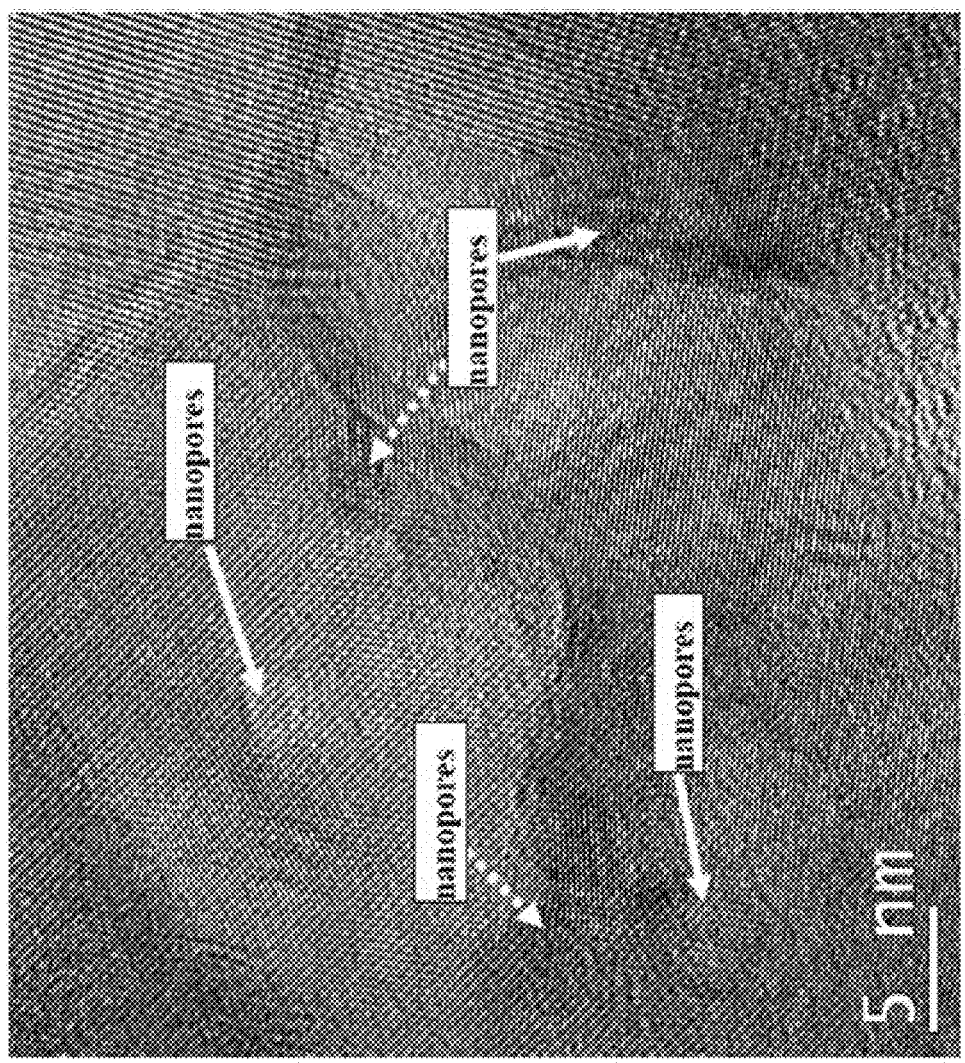

Please refer to FIG. 12, which is a view showing a SEM diagram of a layered $CO_2$-absorbing nanomaterial. As shown in the figure, the present invention fabricates a $CO_2$-capturing material for mid-high temperature which is a layered $CO_2$-absorbing nanomaterial for capturing $CO_2$ at mid-high temperature. The layered $CO_2$-absorbing nanomaterial has a ratio of Ca to Al between 1:1 and 13:1 and has specific LDHs formed of carbonates and hydroxyls of metal oxide microcrystallines to rapidly capture $CO_2$ in any mixture gas at 600° C. for capturing $CO_2$ at mid-high temperature. Therein, amount of $CO_2$ captured is changeable following changes of ratios of Ca to Al for reaching an absorbing ratio of 20~64% g $CO_2$/g sorbent, where the ratios of Ca to Al is 1:1, 3:1, 5:1, 7:1 or 13:1.

Please refer to FIG. 13 to FIG. 15B, which are a view showing a SEM diagram at 1:1 ratio; a first view and a second view showing TEM diagrams at 1:1 ratio; and views showing SEM diagrams at 3:1 ratio at 25° C., 80° C., 100° C., 125° C. and 150° C. As shown in the figures, In FIG. 13, a Ca—Al—$CO_3$ material with a ratio of Ca:Al=1:1 is used to obtain a layered microstructure at 80° C. The microstructure is slitlike with piled layers of size smaller than 100 nanometers (nm), which is a nanostructural material. In FIG. 14A and FIG. 14B, TEM is used for obtaining structural characteristics of the synthesized material in FIG. 13, which is polycrystalline and imperfect stagger arrangements may be formed between synthesis with micropore thus formed. In FIG. 14A, size of each particle is 50 nm and the structure is slitlike with a layer-on-layer arrangement, which is the same as that shown in the SEM diagram. In FIG. 14B, a TEM diagram of crystalline of particle of the layered microstructure with a ratio of Ca:Al=1:1 is shown, where boundaries between domains are shown and the layered microstructure has concaves to prove the porous characteristic.

Figure 15A:
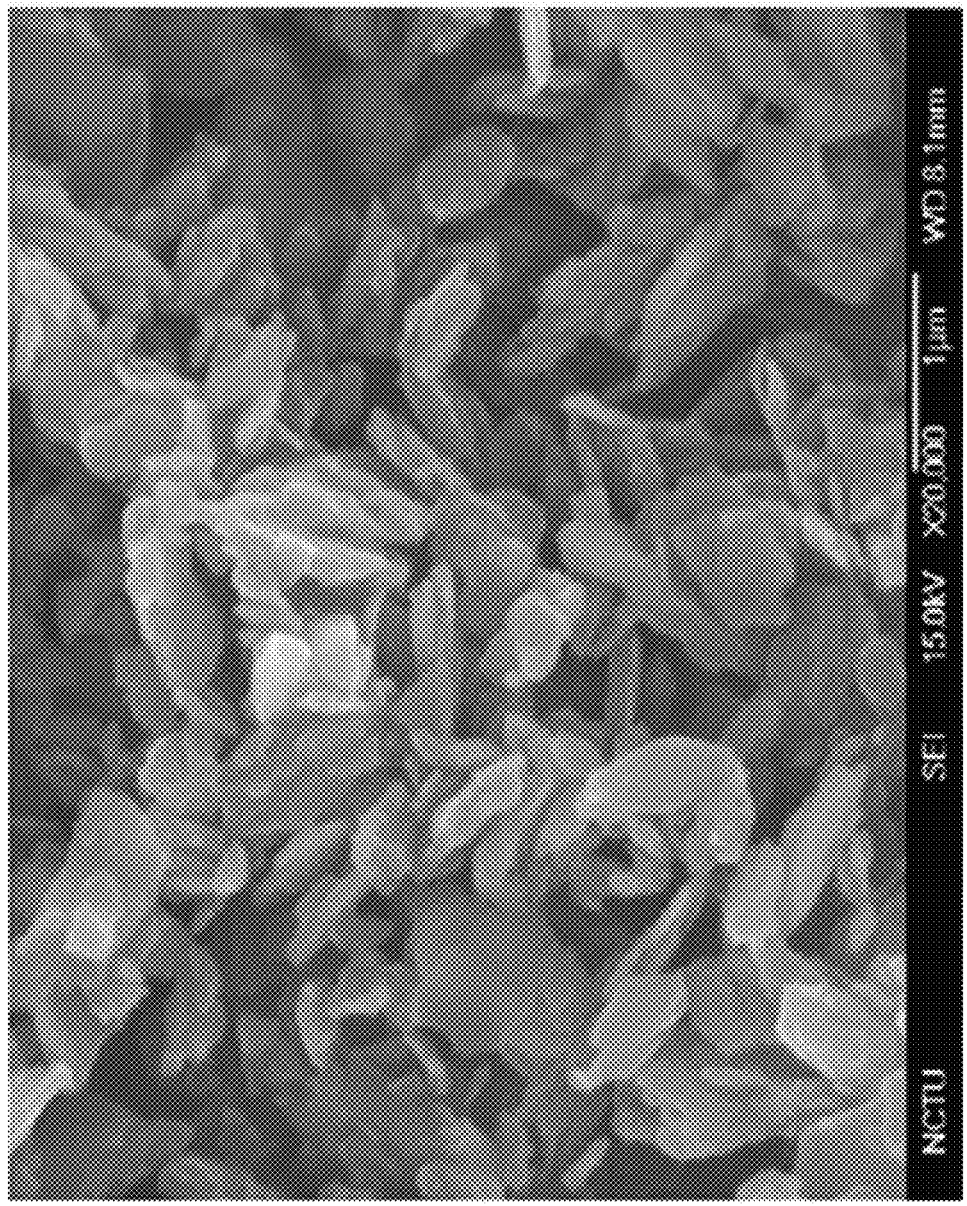
FIG. 15A to FIG. 15E are the views showing the SEM diagrams at 3:1 ratio at 25° C., 80° C., 100° C., 125° C. and 150° C.
Figure 15B:
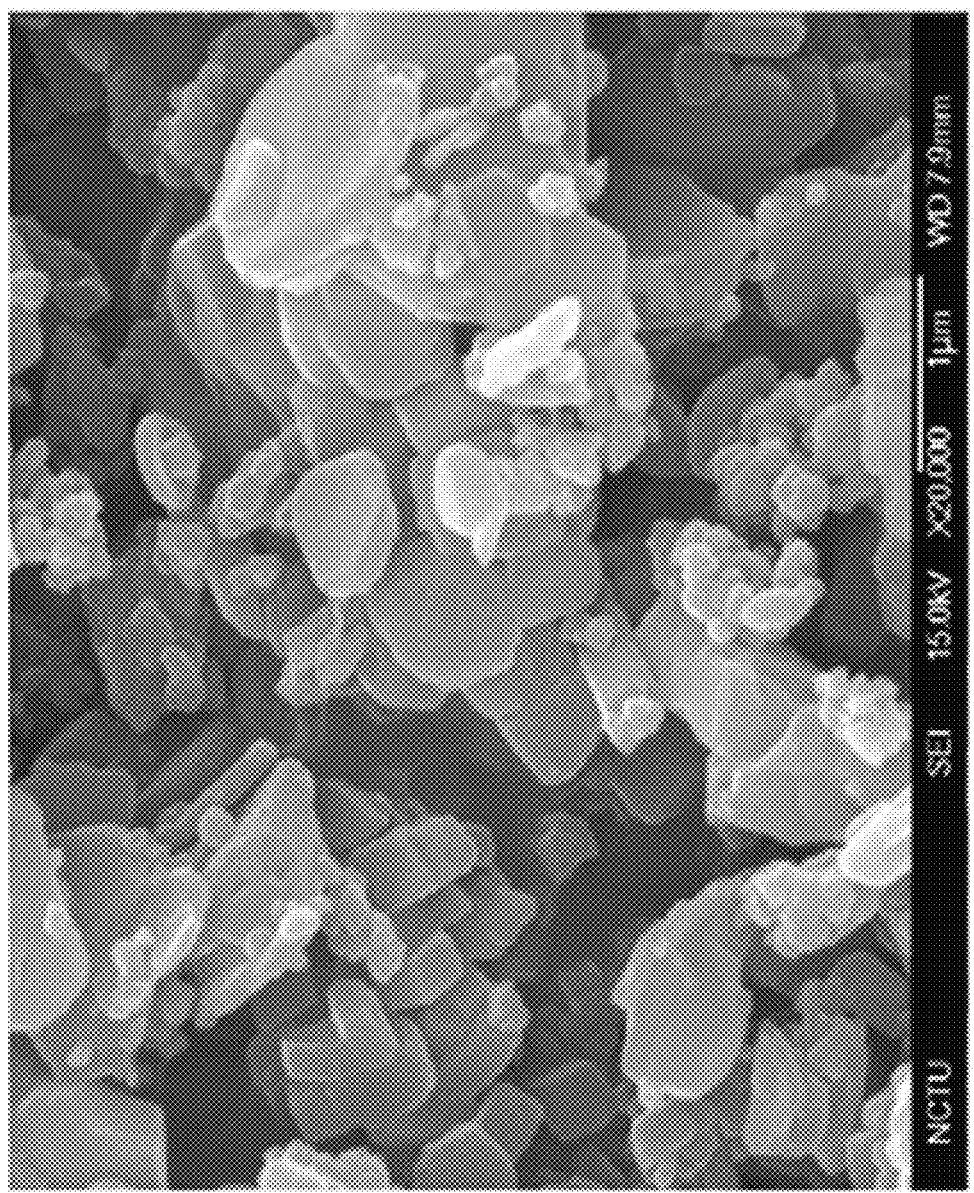
Figure 15C:
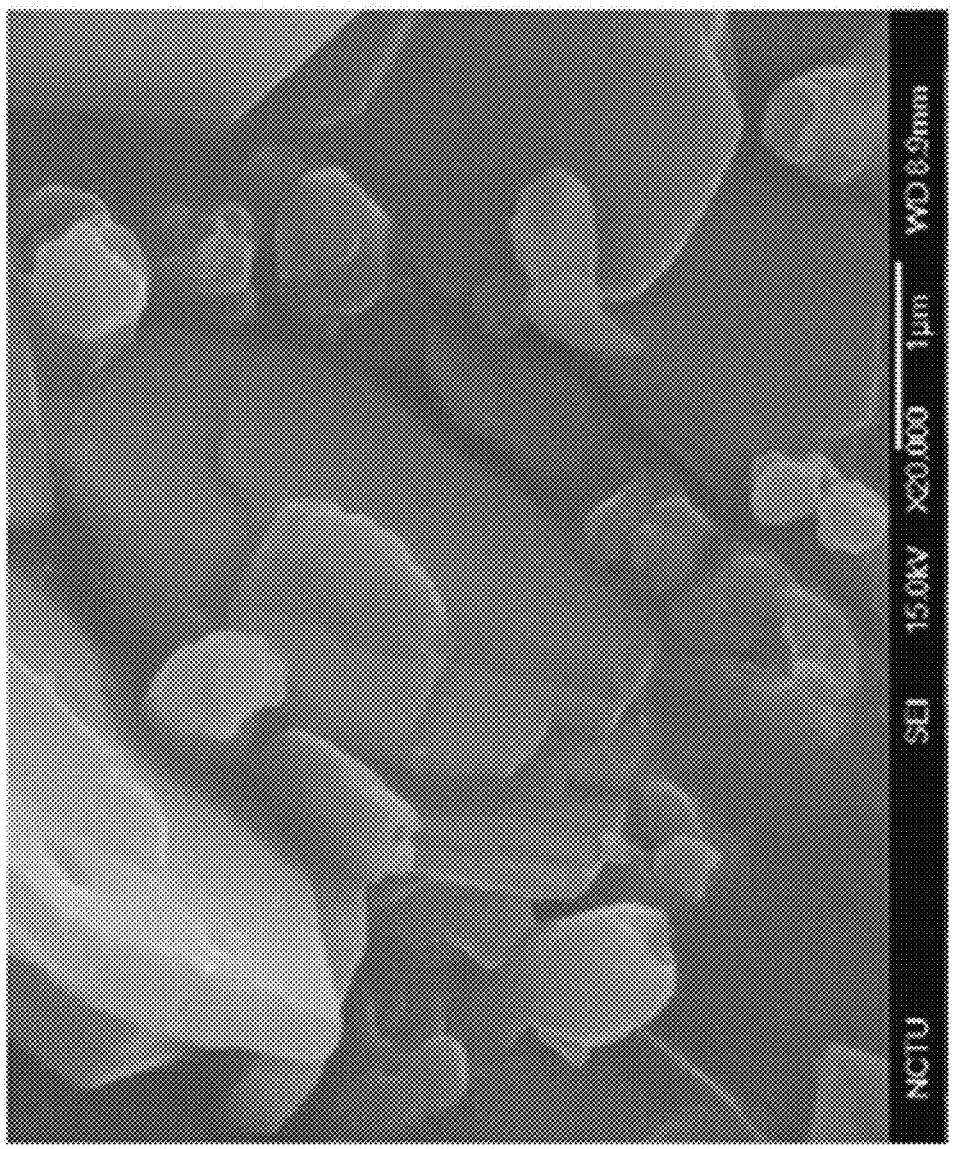
Figure 15D:
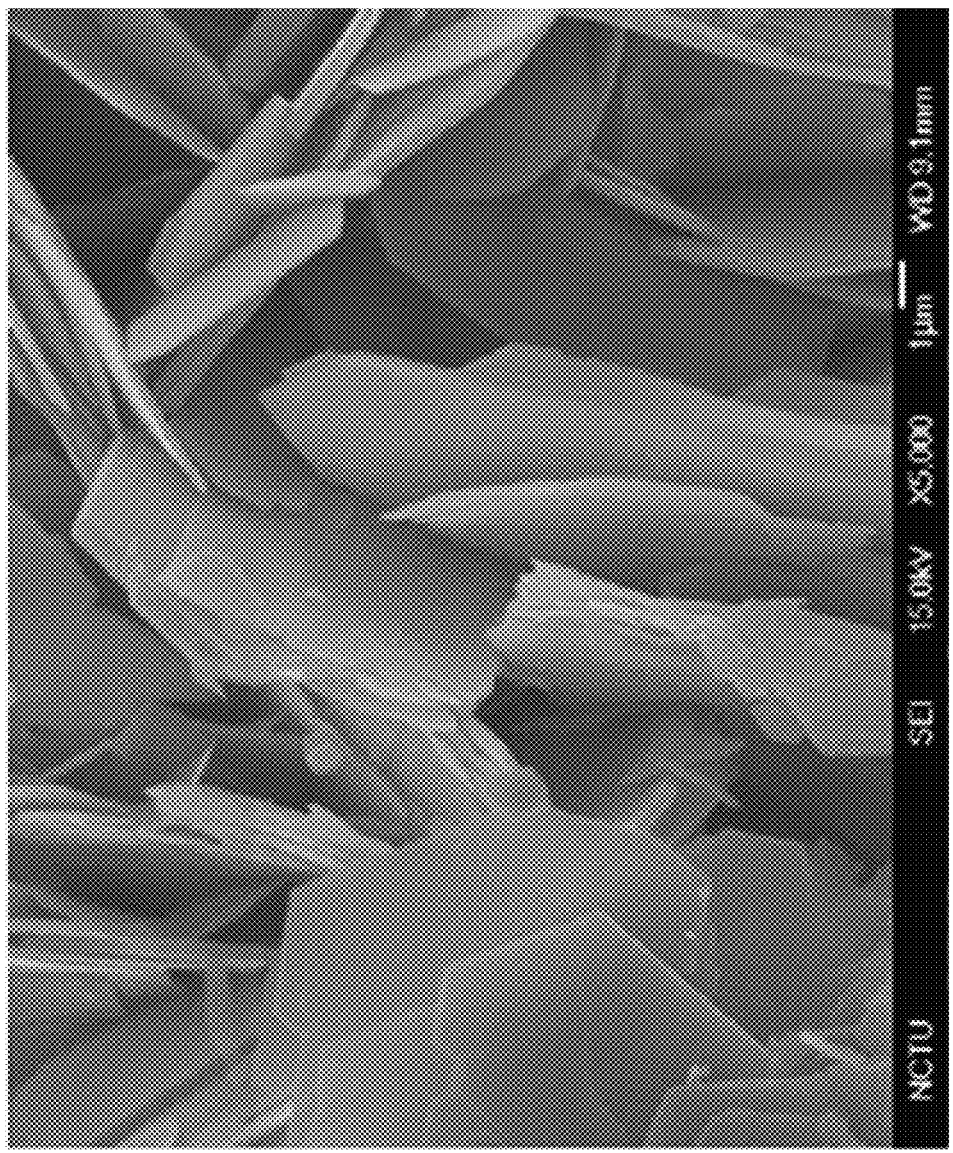
Figure 15E:
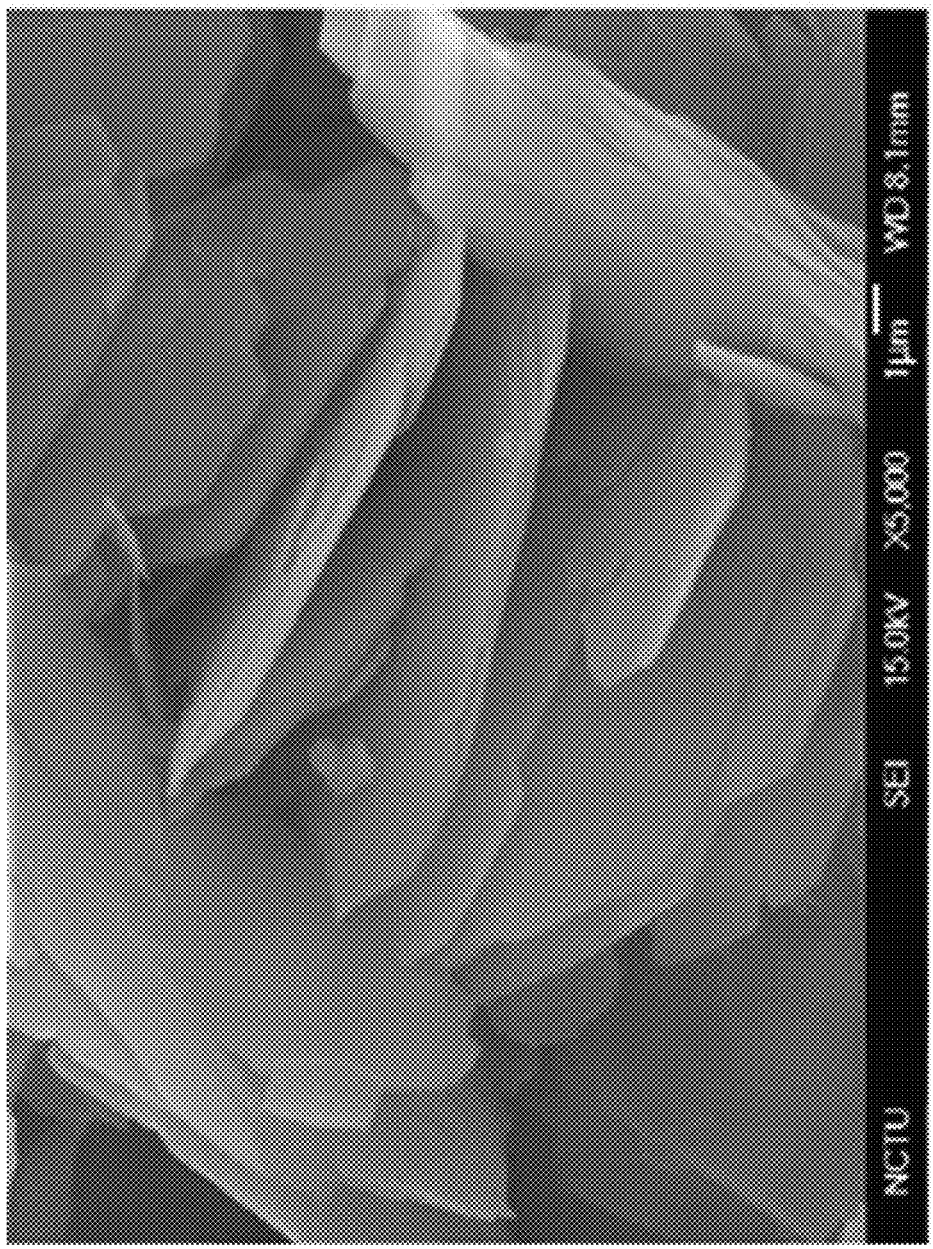

Besides, because the layered microstructure has a close relationship with reaction temperature, crystalline characteristics improve as temperature becomes higher; and size may be thus changed. In FIG. 15A and FIG. 15B, the slitlike materials fabricated below 100° C. according to the present invention have bigger sizes as the temperature gets higher. Yet, in FIG. 15C to FIG. 15E, when the temperature is higher than 100° C., the size of the layered microstructure grow bigger fast and become non-uniform. As a result shows, a temperature too high is not good for forming micropores and capturing $CO_2$ later; and, thus, the temperature for the present invention is controlled below 100° C.

To sum up, the present invention is a method of fabricating a layered nanomaterial used for mid-high temperature $CO_2$ capture, where various ratios of $Ca^{+2}$ and $Al^{+3}$ solutions are obtained for precipitation to obtain a layered material containing Ca, Al carbonates at a calcination temperature; the layered material is easily fabricated and the ratio of metal ions is changeable; and the layered material fast absorbs $CO_2$ and $CO_2$ is released reversibly between 200 and 800° C.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a layered nanomaterial used for mid-high temperature $CO_2$ capture, comprising steps of:
   (a) obtaining nitrate solutions of $Ca^{+2}$ and $Al^{+3}$ as cationic solutions and obtaining NaOH solutions and $Na_2CO_3$ solutions as precipitating agents;
   (b) uniformly mixing said cationic solutions and said precipitating agents into a mixture solution;
   (c) processing a hydrothermal treatment to said mixture solution;
   (d) obtaining precipitates through centrifugal separation and precipitation;
   (e) water-washing said precipitates and then drying said precipitates to remove impurity of ions; and
   (f) processing said precipitates at a calcination temperature between 200° C. and 600° C. to obtain a $CO_2$-capturing material which has Ca, Al carbonates,
   wherein said $CO_2$-capturing material is a layered $CO_2$-absorbing nanomaterial of Ca—Al—$CO_3$ having a micropore structure of CaO;
   wherein said $CO_2$-capturing material is formed of nanoparticles of Ca and Al having dispersed particle sizes in a ratio range of 1:1 to 13:1 for Ca:Al;
   wherein said $CO_2$-capturing material has a structure of specific layered double hydroxides (LDHs) having metal oxide microcrystallines; and
   wherein said nanoparticles has nanopores from mesopores to micropores.

2. The method according to claim 1,
   wherein said precipitates are hydroxides and carbonates of Ca and Al.

3. The method according to claim 1,
   wherein, in step (c), said hydrothermal treatment is processed in a room temperature of about 150° C. for 24 hours.

4. The method according to claim 1,
   wherein said $CO_2$-capturing material has a capturing capacity changeable according to a content ratio of Ca to Al; and
   wherein said content ratio is between 20 and 64% $gCO_2/g$ sorbent.

5. The method according to claim 1,
   wherein said metal oxide microcrystallines have a layered microstructure formed of carbonates and hydroxyls.

6. The method according to claim 1,
   wherein said $CO_2$-capturing material has a ratio of Ca:Al selected from a group consisting of 1:1, 3:1, 5:1, 7:1 and 13:1.

* * * * *